(12) United States Patent
Singh (10) Patent No.: US 10,733,346 B1
(45) Date of Patent: Aug. 4, 2020

(54) SYSTEMS AND METHODS FOR ARC-BASED DEBUGGING IN AN ELECTRONIC DESIGN

(71) Applicant: Cadence Design Systems, Inc., San Jose, CA (US)

(72) Inventor: Sushobhit Singh, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/218,198

(22) Filed: Dec. 12, 2018

(51) Int. Cl.
*G06F 30/3323* (2020.01)
*G06F 30/327* (2020.01)
*G06F 119/12* (2020.01)

(52) U.S. Cl.
CPC ........ *G06F 30/3323* (2020.01); *G06F 30/327* (2020.01); *G06F 2119/12* (2020.01)

(58) Field of Classification Search
CPC .. G06F 17/504; G06F 17/505; G06F 2217/84; G06F 30/3323; G06F 30/327; G06F 2119/12
See application file for complete search history.

(56) References Cited

U.S. PATENT DOCUMENTS

| | | | | |
|---|---|---|---|---|
| 7,000,206 B2 * | 2/2006 | Kidd | ................... | G06F 17/5031 716/108 |
| 7,155,691 B2 * | 12/2006 | Ratzlaff | .............. | G06F 17/5031 716/108 |
| 8,640,066 B1 * | 1/2014 | Gupta | ................... | G06F 17/505 716/102 |
| 8,863,052 B1 * | 10/2014 | Dhuria | ................ | G06F 17/5036 716/108 |
| 10,255,403 B1 * | 4/2019 | Saurabh | .............. | G06F 17/5081 |
| 2004/0088662 A1 * | 5/2004 | Kidd | ................... | G06F 17/5031 716/108 |
| 2004/0163066 A1 * | 8/2004 | Heo | ................... | G01R 31/3016 716/108 |
| 2007/0186198 A1 * | 8/2007 | Lindberg | ............ | G06F 17/5031 716/102 |
| 2007/0220462 A1 * | 9/2007 | Lindberg | ............ | G06F 17/5031 716/108 |
| 2009/0144674 A1 * | 6/2009 | Koithyar | ............. | G06F 17/5031 716/136 |
| 2013/0145338 A1 * | 6/2013 | Mottaez | ................ | G06F 17/505 716/134 |

(Continued)

*Primary Examiner* — Nha T Nguyen
(74) *Attorney, Agent, or Firm* — Mark H. Whittenberger, Esq.; Holland & Knight LLP (57) ABSTRACT

The present disclosure relates to a system for performing static timing analysis in an electronic design. Embodiments may include receiving, using at least one processor, an electronic design at a debugging platform without performing a model extraction phase and mapping one or more extracted timing models ("ETM") to one or more netlist objects associated with the electronic design. Embodiments may further include receiving, at the debugging platform, at least one timing arc specified by a source pin and a sink pin, wherein the at least one timing arc is associated with the electronic design. Embodiments may also include generating a worst timing path based upon, at least in part, the received at least one timing arc. Embodiments may further include generating characterization information for the at least one timing arc based upon, at least in part, one or more user-specified boundary conditions.

20 Claims, 6 Drawing Sheets

(56) References Cited

U.S. PATENT DOCUMENTS

| | | | |
|---|---|---|---|
| 2013/0205269 A1* | 8/2013 | Griesbach | G06F 17/505 716/102 |
| 2014/0096100 A1* | 4/2014 | Sinha | G06F 17/5036 716/113 |
| 2014/0165022 A1* | 6/2014 | Stevens | G06F 17/5031 716/134 |
| 2016/0216316 A1* | 7/2016 | Kim | G06F 17/5031 |
| 2016/0314236 A1* | 10/2016 | Bhanji | G06F 17/5081 |
| 2017/0011161 A1* | 1/2017 | Liao | G06F 17/5031 |
| 2019/0294746 A1* | 9/2019 | Tsai | G06F 17/5031 |

* cited by examiner

SYSTEMS AND METHODS FOR ARC-BASED DEBUGGING IN AN ELECTRONIC DESIGN

FIELD OF THE INVENTION

The embodiments of the invention generally relate to design methods for arc-based debugging of integrated circuit designs.

BACKGROUND

EDA utilizes software tools that may be used in the design and analysis of numerous electronic systems such as printed circuit boards (PCBs) and integrated circuits (ICs). Some EDA tools utilize static timing analysis (STA) as a method to assess the timing of any given digital circuit using software techniques and certain models that provide relevant characteristics of the digital circuit.

Extracted Timing Models (ETMs) are popular hierarchical static timing analysis tools used for hierarchical implementation and signoff. An ETM may refer to an interface timing model of a block, which may be plugged in to a top-level netlist for rapid top-level timing.

Current systems provide the ability to report the timing paths for a given timing arc, which reports the worst timing path used for characterizing an interface arc. If users generally want to look at a specific arc, they need to browse the design and determine the combination of interest which might lead to this arc. This is a cumbersome and counter intuitive way of debugging. More intuitive debugging is based on the arcs, and with arcs specified by user an ETM debugger should be able to get the debug information. Another serious limitation with the current method is that it doesn't explicitly depicts the process of characterization.

Existing systems do not have any arc-based debugging capabilities. With timing model extraction becoming more accurate due to latest technological inclusion, arc based debugging is a necessity. Accordingly, there is a lack of debugging solutions based on arcs in extracted timing models. Existing approaches are merely reporting mechanisms and cannot be used for detailed debugging based on arcs.

SUMMARY

In one or more embodiments of the present disclosure, a computer-implemented method for performing static timing analysis in an electronic design. The method may include receiving, using at least one processor, an electronic design at a debugging platform without performing a model extraction phase and mapping one or more extracted timing models ("ETM") to one or more netlist objects associated with the electronic design. The method may further include receiving, at the debugging platform, at least one timing arc specified by a source pin and a sink pin, wherein the at least one timing arc is associated with the electronic design. The method may also include generating a worst timing path based upon, at least in part, the received at least one timing arc. The method may further include generating characterization information for the at least one timing arc based upon, at least in part, one or more user-specified boundary conditions.

One or more of the following features may be included. In some embodiments, the method may include receiving, at the debugging platform, at least one timing arc type to be reported. The method may further include displaying the worst timing path at a graphical user interface associated with the debugging platform. The characterization information may include one or more of data segment delays, clock segment delays, timing check value, characterization adjustments, and characterization value. The at least one timing arc type may include one or more of timing check arcs, sequential arcs, and combinational arcs. The timing check arcs may include one or more of setup, hold, recovery, removal, no change, data to data, and clock style checks. The worst timing path may include a path having a worst negative slack.

In one or more embodiments of the present disclosure a computer-readable storage medium having stored thereon instructions, which when executed by a processor result in one or more operations is provided. Operations may include receiving, using at least one processor, an electronic design at a debugging platform without performing a model extraction phase and mapping one or more extracted timing models ("ETM") to one or more netlist objects associated with the electronic design. Operations may also include receiving, at the debugging platform, at least one timing arc and generating a worst timing path based upon, at least in part, the received at least one timing arc. Operations may also include displaying the worst timing path at a graphical user interface associated with the debugging platform.

One or more of the following features may be included. Operations may further include receiving, at the debugging platform, at least one timing arc type to be reported. Operations may also include generating characterization information for the at least one timing arc based upon, at least in part, one or more user-specified boundary conditions. The characterization information may include one or more of data segment delays, clock segment delays, timing check value, characterization adjustments, and characterization value. The at least one timing arc type may include one or more of timing check arcs, sequential arcs, and combinational arcs. The timing check arcs may include one or more of setup, hold, recovery, removal, no change, data to data, and clock style checks. The worst timing path may include a path having a worst negative slack.

In one or more embodiments of the present disclosure, a method for performing static timing analysis in an electronic design is provided. The method may include receiving, using at least one processor, an electronic design at a debugging platform without performing a model extraction phase and mapping one or more extracted timing models ("ETM") to one or more netlist objects associated with the electronic design. The method may further include receiving, at the debugging platform, at least one timing arc specified by a source pin and a sink pin, wherein the at least one timing arc is associated with the electronic design. The method may also include generating a worst timing path based upon, at least in part, the received at least one timing arc, wherein generating a worst timing path includes performing timing reporting for one or more user-specified boundary conditions without performing a timing update. The method may also include generating characterization information for the at least one timing arc based upon, at least in part, one or more user-specified boundary conditions.

One or more of the following features may be included. In some embodiments, the method may include receiving, at the debugging platform, at least one timing arc type to be reported. Mapping may include generating a data structure corresponding to the mapping and storing the data structure. The characterization information may include one or more of data segment delays, clock segment delays, timing check value, characterization adjustments, and characterization value. The at least one timing arc type may include one or more of timing check arcs, sequential arcs, and combinational arcs. The timing check arcs may include one or more of setup, hold, recovery, removal, no change, data to data, and clock style checks.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

Embodiments of the present disclosure are directed towards a system and method for performing arc-based debugging of a representative timing model for a digital circuit. Extracted timing models represent the interface timing of a block using timing arcs. The interface timing may be represented as look up tables on various characterization points. Once it is characterized there is no means for the designers to know from where the numbers have come. Accordingly, embodiments of arc-based debugging process included herein provide a debugging mechanism which is model timing arc centric. Embodiments included herein provide for seamless and intuitive arc-based debugging of the timing models. A mapping structure is included that is configured to map the timing model objects with the netlist object, which allows the debugger to generate the debug information.

As used herein, the phrase "timing model" or "timing graph" may refer to a collection of arcs and checks which represents the timing behavior of a logic design. An "arc", as used herein, may refer to a path between pins or nodes of a timing graph that illustrates a signal can pass arrival time and slew from the input pin/node to the output (considering polarity) and/or may represent delay/slew of logic blocks or wires between pins of logic blocks. The phrase "static timing" may refer to an exhaustive method of measuring a design's timing robustness by building a timing graph of the design, providing signal arrival times, propagating these and identifying critical paths. The phrase "timing elements" may refer to logical context defining arcs and checks among three points in a timing graph. Some of these may include, but are not limited to, latches, flip flops, clock gates, etc.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
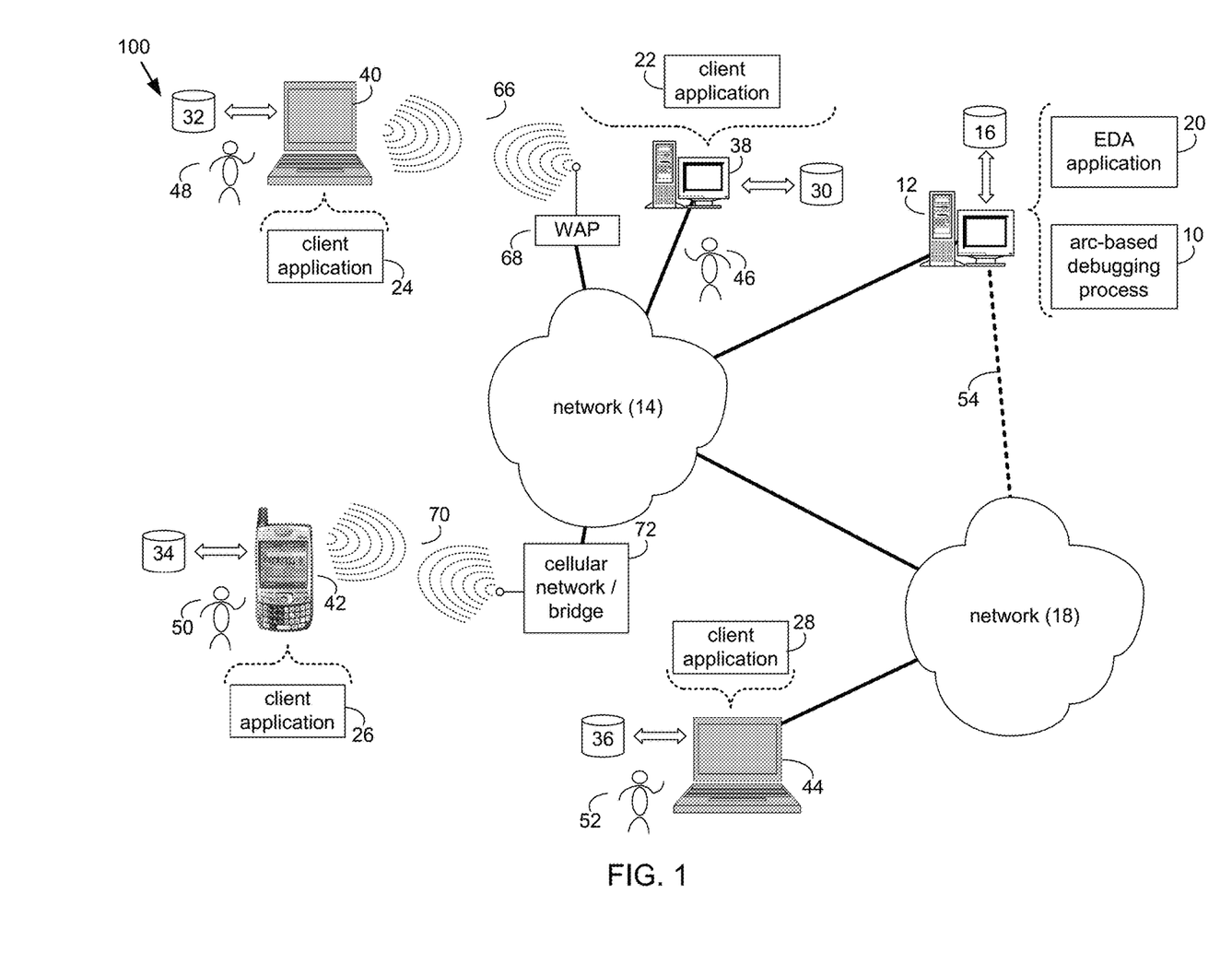
FIG. 1 illustrates a block diagram of an exemplary system for arc-based debugging in accordance with embodiments of the present disclosure.

Referring to FIG. 1, there is shown an arc-based debugging process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, arc-based debugging process 10 may reside on and be executed, in whole or in part, by a client electronic device, such as a personal computer, notebook computer, personal digital assistant, or the like.

The instruction sets and subroutines of arc-based debugging process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Web server is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Arc-based debugging process 10 may be a stand alone application, or may be an applet/application/script that may interact with and/or be executed within EDA application 20. In addition/as an alternative to being a server-side process, arc-based debugging process 10 may be a client-side process (not shown) that may reside on a client electronic device (described below) and may interact with an EDA client application (e.g., one or more of EDA client applications 22, 24, 26, 28). Further, arc-based debugging process 10 may be a hybrid server-side/client-side process that may interact with EDA application 20 and an EDA client application (e.g., one or more of client applications 22, 24, 26, 28). As such, arc-based debugging process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize arc-based debugging process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
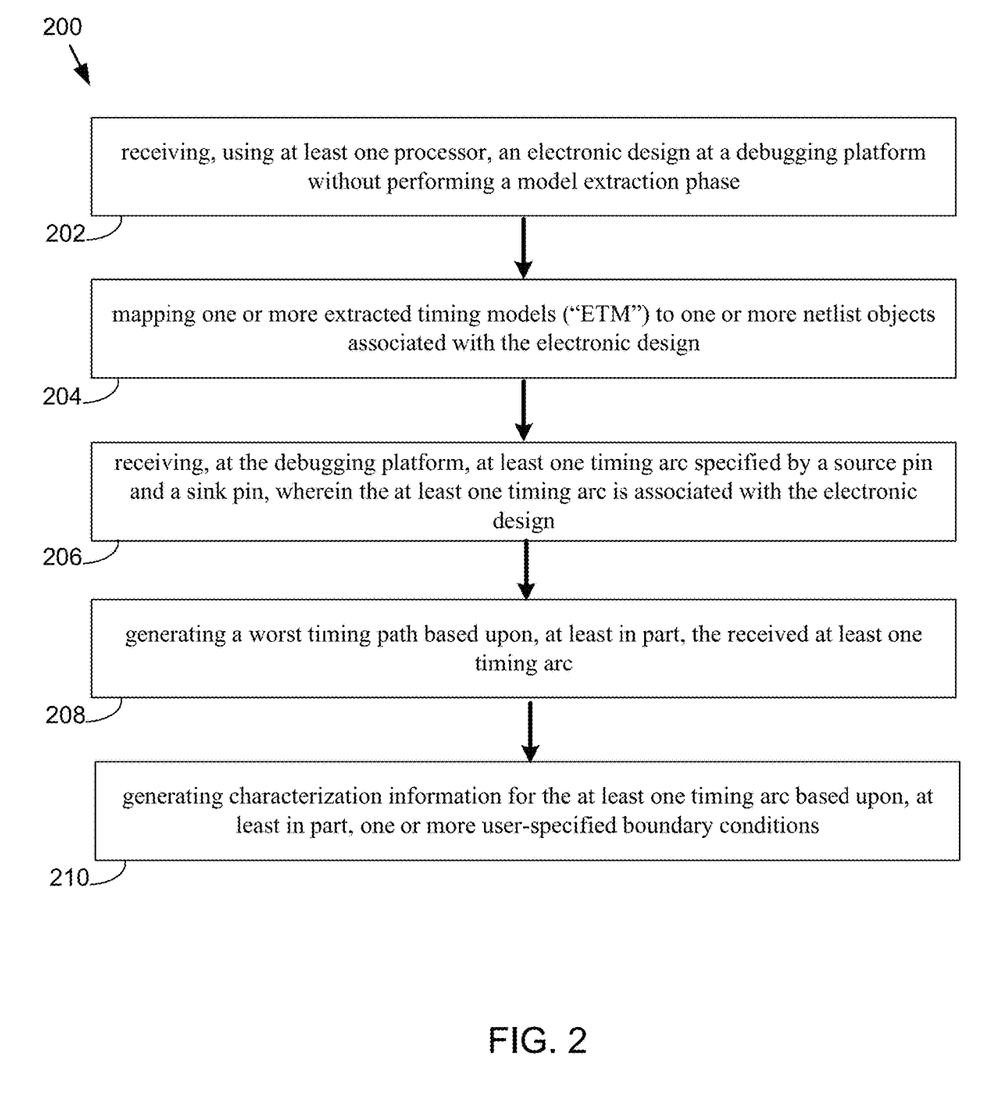
FIG. 2 illustrates a flowchart showing operations consistent with embodiments of the present disclosure.

Referring now to FIG. 2, an exemplary flowchart 200 depicting operations consistent with arc-based debugging process 10 is provided. The method may include receiving (202), using at least one processor, an electronic design at a debugging platform without performing a model extraction phase and mapping (204) one or more extracted timing models ("ETM") to one or more netlist objects associated with the electronic design. Embodiments may further include receiving (206), at the debugging platform, at least one timing arc specified by a source pin and a sink pin, wherein the at least one timing arc is associated with the electronic design. Embodiments may also include generating (208) a worst timing path based upon, at least in part, the received at least one timing arc. Embodiments may further include generating (210) characterization information for the at least one timing arc based upon, at least in part, one or more user-specified boundary conditions.

Figure 3:
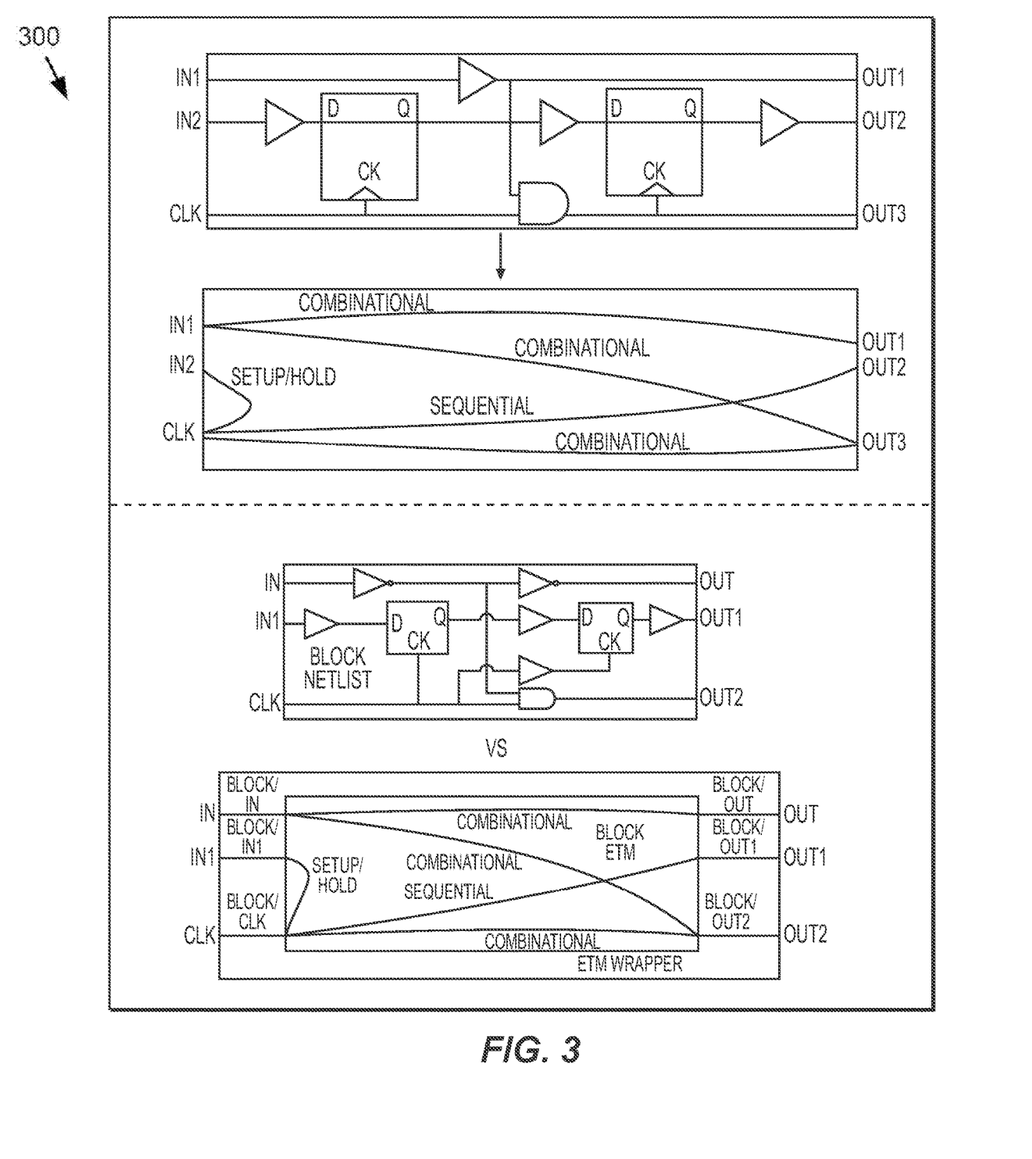
FIG. 3 illustrates a schematic showing extracted timing model generation and stitching consistent with embodiments of the present disclosure.

Referring now to FIG. 3, an example showing Extracted Timing Models (ETM) generation and top-level stitching is provided. ETMs are hierarchical static timing analysis tools used for hierarchical implementation and signoff. An ETM is an interface timing model of a block, which may be plugged in to the top-level netlist for rapid top-level timing. FIG. 3 describes the ETM model for the given design block in the figure. It describes the various types of arcs which are characterized in the extracted timing model. The types of arcs that are shown are timing check arc, sequential arc and combinational arc. In the second part of FIG. 3, a top level integration of the timing model is described, where the timing model is instantiated as an instance in the top level design. Using this approach, the worst timing path for each path group, other than the register-register internal paths, may be enumerated by performing the timing analysis, and each worst-case timing path may be characterized for a range of input conditions. FIG. 3 describes the process of ETM generation and top-level plugin, leading to a reduction in the netlist and other information and hence improved runtime for the design implementation and closure.

In some embodiments, arc-based debugging process 10 may include a model extractor that may be configured to apply a set of slews at each path start point, and a set of loads at the primary ports. An accurate ETM will lead to better top-level timing implementation and/or signoff. Inherently, model extraction leads to a delay/transition look-up-table ("LUT") modeling the timing path information, thus, designers are always interested in understanding the ways in which a LUT is derived, hence debug capabilities for extracted model are always in high demand.

Embodiments of arc-based debugging process 10 may be used to debug the extracted timing model, through timing arcs. Accordingly, an arc timing path debugging flow may be used to report a timing path used for interface arc extraction and/or for the timing conditions which are used for analysis in the given session. This may provide the user with a very clear indication of the worst timing path used for characterizing the arc. Existing timing report commands can be used to get the path reports, by applying the right combinations of clocks and ports, but this flow offers a simplistic and more intuitive use model which requires the user to provide the timing arc and the debugger may be configured to decipher the reporting commands from within and reports the timing path. This may be performed using an ETM netlist map as is discussed below.

In some embodiments, arc-based debugging process 10 may generate a timing path report that may report a timing path in the design. For every reporting command, the STA tool may report the most critical timing path, the path having worst negative slack. The timing path report may capture all of the elements on the path and report the timing specific information. Some of this information may include, but is not limited to, signal transitions, signal delays, pin capacities, etc.

Embodiments of arc-based debugging process 10 may be used to perform an extraction based debug flow. The extraction based debugging flow may be configured to allow the user to probe the debugger to report a timing path for a given interface arc and characterization point, for example, the input slew and/or output load. This may enable limited timing path reporting for a given slew and/or primary output load wherever applicable.

In some embodiments, model extraction may occur at different slew points at the input/clock ports and different load points at the end ports. Characterization happens at different boundary conditions for the block. These boundary conditions may be input transitions or slews, or output side capacitive load. In timing analysis, changes in the boundary conditions lead to timing updates which are runtime intensive tasks. In some embodiments, the present disclosure may be configured to effectively apply the boundary conditions and not trigger the timing update, making it a light weight method. There are no other possible light weight ways to get this information. One prior approach involves applying the same slews and/or load to the timing ports, using timing constraints. This involves multiple timing updates and is not a practical solution. To address this issue, embodiments included herein provide a low-cost solution which is accurate and does not require any timing updates.

Figure 4:
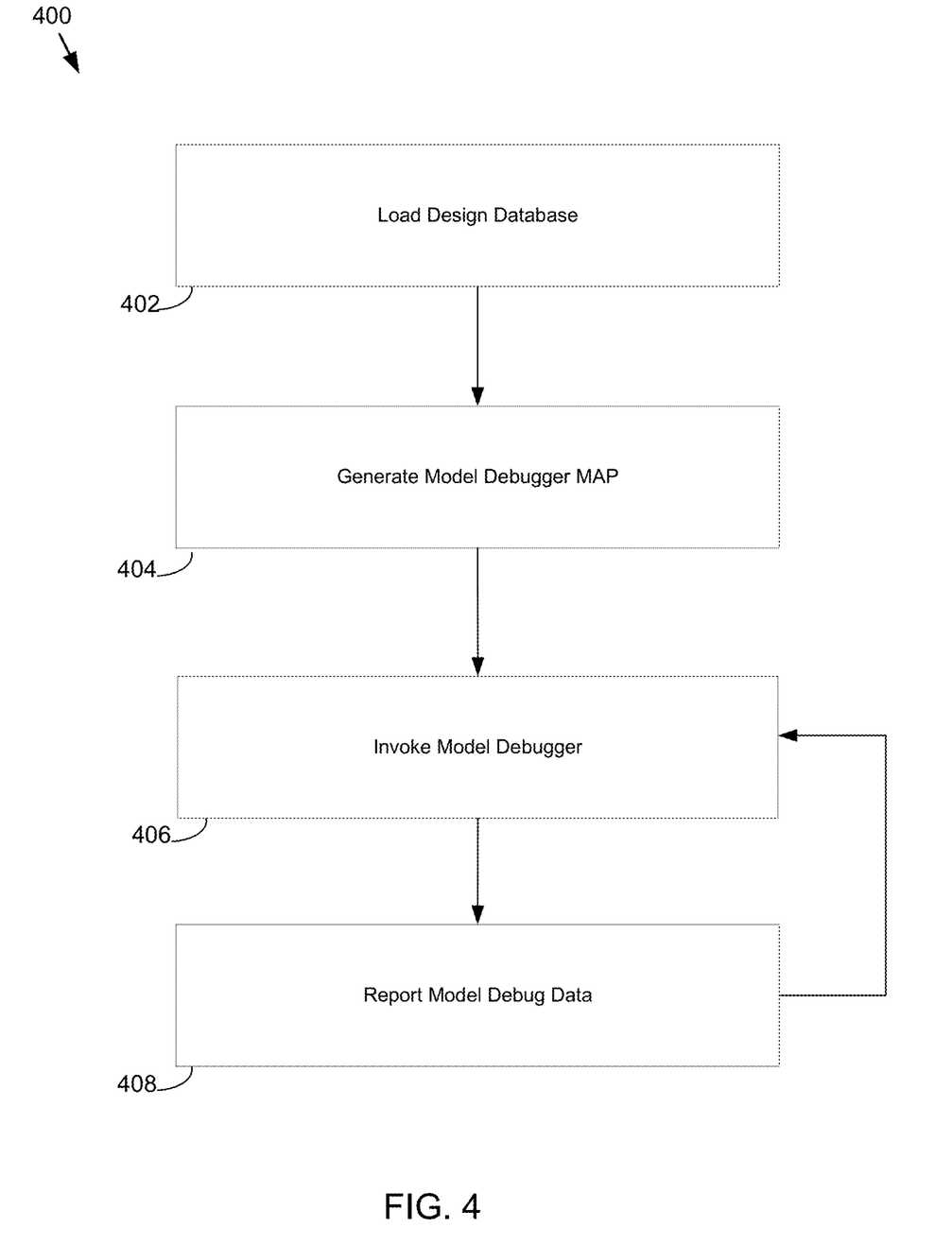
FIG. 4 illustrates a flowchart showing operations consistent with embodiments of the present disclosure.

In some embodiments, and referring also to FIG. 4, an embodiment showing a flowchart consistent with arc-based debugging process 10 is provided. In operation, the design database may be loaded 402 and the model debugger map may be generated 404. The model debugger may be configured to mimic the model extraction and perform DC interactions on the characterization points provided for debugging. The model debugger may invoke 406 a minimal reporting feature and report 408 the timing arcs along with delay and slew across those arcs, for the provided characterization points. This flow makes the offering very flexible and generic.

In some embodiments, and in addition to the timing information, both flows of arc-based debugging process 10 described above may also report the characterization equations used to derive the LUT values from the timing path information. Accordingly, arc-based debugging process 10 may generate an arc characterization report, which may include all of the information that is used for characterizing the arc on screen. Some arc types may include, but are not limited to, timing check arcs, sequential arcs, combinational arcs, etc. Each of these are discussed in further detail hereinbelow.

In some embodiments, a timing check arc may refer to one or more timing arcs in the extracted timing model which may be used to model the timing checks at the end point of a timing path. Some timing check arcs may include, but are not limited to, setup, hold, recovery removal, no change, data to data, clock style checks (clock period and pulse width), etc. A "Setup Arc" may model the setup time requirement of a sequential timing end point. A "Hold Arc" may model the hold time requirement of a sequential timing end point. A "Recovery Arc" may be used to model the asynchronous recovery timing check for a timing end point. A "Removal Arc" may be used to model the asynchronous removal check for a timing end point. A "No change Arc" may assert the requirement of no change in a signal for a given time window. A "Data to Data" check may be used to model the timing check requirements between two data signals. A "Clock Style Check" such as "Clock Period", which may be used to model the clock period assertion on a sequential cell clock pin and "Pulse width", which may be used to model the minimum pulse width requirement at a sequential cell clock pin may also be employed.

In some embodiments, a sequential arc may refer to timing arcs in the model which are used to model the trigger of a signal with respect to a clock or control signal from a sequential timing start point. A combinational arc may refer to one or more timing arcs in the timing model which may be used for modelling the delay of a purely combinational path in the design.

In some embodiments, arc-based debugging process 10 may utilize arc characterization reporting for reporting the characterization information. The arc characterization report may report a number of different types of data for characterizing boundary conditions on arc source and sink pins. Some types of data may include, but are not limited to, data segment delays, clock segment delays, timing check values, characterization adjustments, characterization values and math, etc. The phrase "data segment delay" may refer to the cumulative delay for all elements on the data segment of the path used for characterization. This may not contain the boundary delays applied on the start of the timing path. This information may be used in the timing reporting but not in the arc characterization reporting. The phrase "clock segment delay" may refer to the cumulative delays of all elements on the clock path segment. It may not contain the boundary information, and only the point to point delay is used. The phrase "timing check value" may refer to wherever applicable (check arcs) the timing check value based on the propagated transition times on the data and clock segments. The phrase "characterization adjustment" may refer to quantities, like uncertainty, common path pessimism removal ("CPPR"), advanced on-chip variation ("AOCV") adjustments, etc. that cannot be modeled through timing arc are adjusted in the characterization value. The phrase "characterization value and math" may refer to a characterization value which may be written out in the timing model using above data.

In some embodiments, sample information that may be generated by arc-based debugging process 10 may include, but is not limited to:

CHECK PATH, <signal slew, reference slew>—[For a given reference and signal slew set reports the path and justifies the extracted number]
<TIMING PATH SUMMARY>
Data Path Arrival (30)=200 ps
Clock Path Arrival (24)=240 ps
Setup Check Value (38, 30)=24 ps
Extracted Setup Check Value (30, 24)=24+200−240=−26
DELAY/TRIGGER PATH <input slew, output load>—[For a given input slew and output load, reports the path and justifies the extracted number]
<TIMING PATH SUMMARY>
Data Path Arrival(24,15)=200 ps In some embodiments, arc-based debugging process 10 may be configured to report the worst path used for characterization, based on the timing arc itself. This has a huge advantage, as it is the timing arc that the user looks at in the timing model. User will not need to review the details of ports/clocks, etc. to be able to report a path. This is a huge advantage over existing systems and provides a highly intuitive debugging interface.

In some embodiments, arc-based debugging process 10 may be configured to report the worst path used for characterization, based on timing arc, for a given set of characterization points, without timing updates. This allows the user to obtain timing information for the path without performing timing updates.

In some embodiments, arc-based debugging process 10 may be configured to report one or more characterization equations which have led to the LUT information for the given characterization point. This provides a complete picture and explanation of the ETM generation to the user.

In some embodiments, arc-based debugging process 10 does not require the loading of an extracted model or to perform model extraction in order to debug. In other words, using the teachings of the present disclosure, debugging a model does not require loading the model. The user needs only to be aware of the timing arcs, so any debugging run only requires the user to specify the arc to be debug and rest of the flow runs automatically. No model extraction need be performed or even loaded.

In some embodiments, arc-based debugging process 10 may include an ETM to netlist mapping structure. This may include the mapping of ETM objects to the netlist objects, an example is referenced herein as "ETM_NETLIST_MAP". In some embodiments, the extracted model may consist of primary ports and some special internal pins in the design, which may represent the interface timing. The ETM_NETLIST_MAP is a map of internal ETM objects and related netlist objects. This may be used by the model debugger to extract a path based on an arc from the netlist. This detail is internal to the debugger and user may not be exposed of this information.

Figure 5:
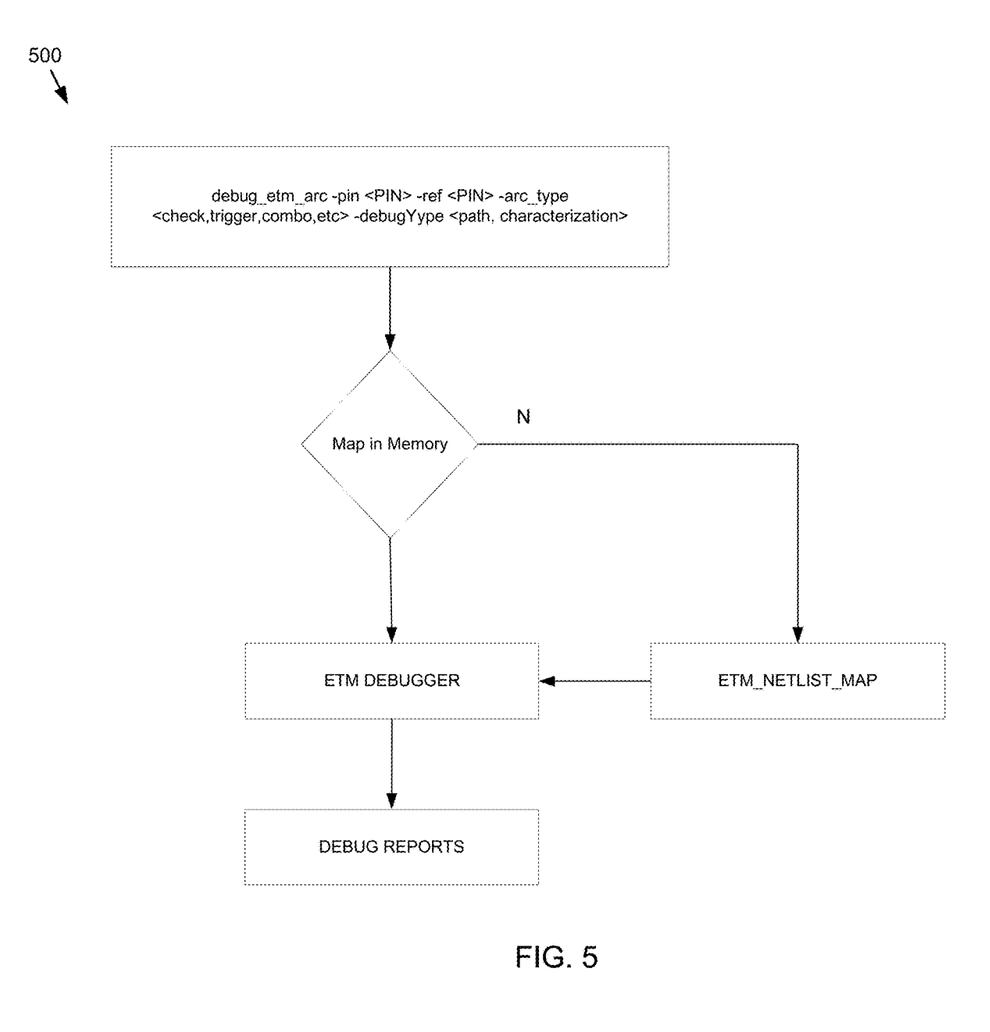
FIG. 5 illustrates a flowchart showing operations consistent with embodiments of the present disclosure.

Referring now to FIG. 5, an example flowchart consistent with embodiments of arc-based debugging process 10 is provided. As shown in the flowchart, the ETM arc debugger may take the debug commands on the arcs as options and builds the ETM_NETLIST_MAP in memory. As shown in FIG. 5, a command (e.g., debug_etm_arc) may be included, which may receive the signal and reference pins along with timing arc type and type of debug path or characterization debug. Additionally and/or alternatively, the debugger may also be provided with slew and load on which the characterization has already taken place. The first debug command may build the map and subsequent commands will use the map.

In some embodiments, arc-based debugging process 10 may receive a timing Arc specified using source and sink pin and or a timing arc type to be reported, if same set of pins have more than one arcs. The output of the arc-based debugging process 10 may include a timing path used for arc characterization. The timing path may include a worst timing path and related timing information may be printed on the screen, in timing reports or any other standard timing path reporting format. The timing path may also include boundary conditions used for timing are the same as used for timing analysis, i.e. the boundary conditions are derived from the original user defined constraints which are used for static timing analysis. Arc-based debugging process 10 may also include characterization information for the arc based on the boundary conditions for the timing analysis, per original user specified constraints.

Figure 6:
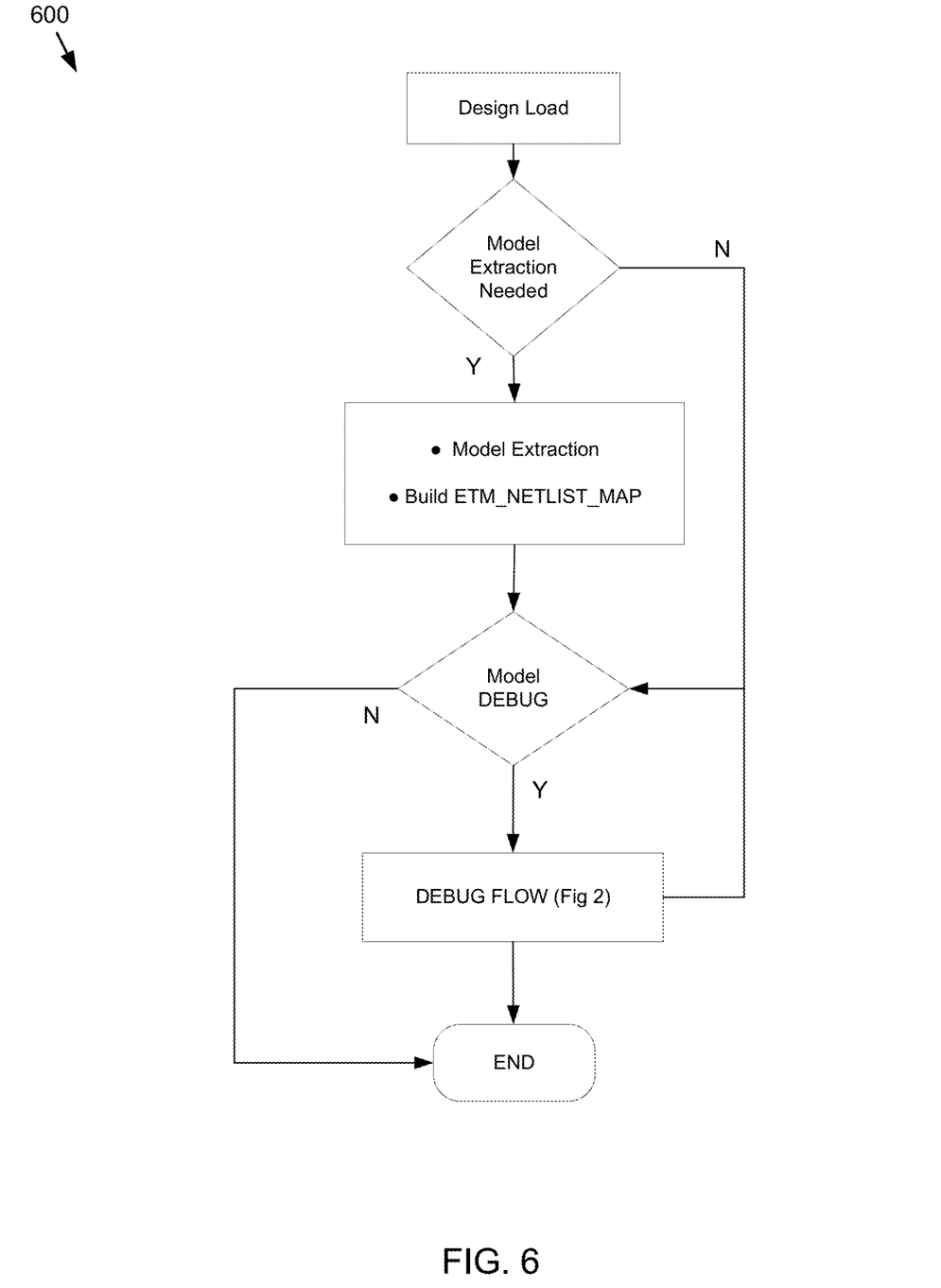
FIG. 6 illustrates a flowchart showing operations consistent with embodiments of the present disclosure.

Referring now to FIG. 6, a flowchart showing operations consistent with arc-based debugging process 10 is provided. Embodiments included herein provide a methodology to perform ETM debugging without the need to perform model extraction. Once the design is loaded, a user can directly switch to model debug flow, shown in FIG. 5. With regard to model extraction, the ETM_NETLIST_MAP may be built in memory and is not required to be rebuilt in the debug command, which is otherwise needed in case of direct model debug.

In some embodiments, and as shown in FIG. 6, the system may receive a timing arc that may be specified using a source and sink pin. The system may also receive a timing arc type to be reported, if the same set of pins have more than one arc. The boundary conditions on which debug is needed may also be received as an input to the system. The system may then output a timing path used for arc characterization. The path may be selected based on the worst path which is used for analysis provided above. Without any timing update, timing reporting may be performed for the boundary conditions as specified by the user. This changes the delays and transitions of the signal on path, but this does not trigger the timing update, which is a very costly operation. The system may also output characterization information for the arc based on the user specified boundary conditions.

It should be noted that in some embodiments, for example the flowcharts depicted in FIGS. 5-6, model extraction is not required. In this way, the user may load the design and initiate debugging. The central data structure (e.g. ETM_NETLIST_MAP) may be populated by the ETM debugger. This structure may include the mapping of the ETM objects to the original netlist objects. This may be particularly useful for original netlist objects (e.g., pins getting translated into model internal pins, etc.). The extraction debugger may maintain the mapping in memory and use the same during debugging for probing timer to get the reports. The first time the debugger is invoked, it may generate the map in memory and use the map in subsequent runs.

Embodiments included herein provide the user with improved debugging agility as they do not have to do model extraction again and again to debug. Moreover, the mapping procedure discussed above allows the user to debug the ETM with the design load only, which is a huge advantage over the current methods of debugging. The user is provided with more flexibility as they do not have to bother about actual netlist objects and the mapping procedure will provide this mapping to them, and thus making debugging far more intuitive.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result.

The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

When implemented as an apparatus for performing the operations described herein, the apparatus may be specially constructed for the required purposes, or it may comprise a general-purpose computer selectively activated or reconfigured by a computer program stored in the computer. Such a computer program may be stored in a computer readable storage medium, any type of storage media or device suitable for storing electronic instructions, and each coupled to a computer system bus.

The processes presented herein are not inherently related to any particular computer or other apparatus. Various general-purpose systems may be used with programs in accordance with the teachings herein, or it may prove convenient to construct a more specialized apparatus to perform the operations described.

When implemented in software, the elements of the embodiments of the invention are essentially the program, code segments, or instructions to perform the tasks. The program, code segments, or instructions can be stored in a processor readable medium or storage device that can be read and executed by a processor or other type of computing machine. The processor readable medium may include any storage medium or storage device that can store information in a form readable by a processor or other type of computing machine. The program or code segments may be downloaded via computer networks such as the Internet, Intranet, etc. and stored in the processor readable medium or storage device.

When implemented as a system, such as an electronic computer aided design (ECAD) system, the elements of the embodiments of the invention include one or more processors to execute the program, code segments, or instructions that may be stored in a processor readable medium or storage device to perform the tasks or functions of a method or process. The one or more processors may be specifically adapted to electronic computer aided design including processing logic that may comprise hardware (e.g., circuitry, dedicated logic, etc.), software, or a combination of both.

The embodiments of the invention are thus described. While embodiments of the invention have been particularly described, they should not be construed as limited by such embodiments. The embodiments of the invention should be construed according to the claims that follow below.

What is claimed is:

1. A computer-implemented method for performing static timing analysis in an electronic design comprising:
   storing one or more extracted timing models ("ETM") at a data storage device;
   receiving, using at least one processor, an electronic design at a debugging platform without performing a model extraction phase;
   mapping the one or more stored extracted timing models ("ETM") to one or more netlist objects associated with the electronic design;
   receiving, at the debugging platform, at least one timing arc specified by a source pin and a sink pin, wherein the at least one timing arc is associated with the electronic design;
   generating a worst timing path based upon, at least in part, the received at least one timing arc; and
   generating characterization information for the at least one timing arc based upon, at least in part, one or more user-specified boundary conditions.

2. The computer-implemented method of claim 1, further comprising:
   receiving, at the debugging platform, at least one timing arc type to be reported.

3. The computer-implemented method of claim 1, further comprising:
   displaying the worst timing path at a graphical user interface associated with the debugging platform.

4. The computer-implemented method of claim 1, wherein the characterization information includes one or more of data segment delays, clock segment delays, timing check value, characterization adjustments, and characterization value.

5. The computer-implemented method of claim 2, wherein the at least one timing arc type includes one or more of timing check arcs, sequential arcs, and combinational arcs.

6. The computer-implemented method of claim 5, wherein the timing check arcs include one or more of setup, hold, recovery, removal, no change, data to data, and clock style checks.

7. The computer-implemented method of claim 1, wherein the worst timing path includes a path having a worst negative slack.

8. A non-transitory computer-readable storage medium having stored thereon instructions that when executed by a machine result in the following operations:
   storing one or more extracted timing models ("ETM") at a data storage device;
   receiving, using at least one processor, an electronic design at a debugging platform without performing a model extraction phase;
   mapping the one or more stored extracted timing models ("ETM") to one or more netlist objects associated with the electronic design;
   receiving, at the debugging platform, at least one timing arc;
   generating a worst timing path based upon, at least in part, the received at least one timing arc; and
   displaying the worst timing path at a graphical user interface associated with the debugging platform.

9. The computer-readable storage medium of claim 8, further comprising:
   receiving, at the debugging platform, at least one timing arc type to be reported.

10. The computer-readable storage medium of claim 8, further comprising:
    generating characterization information for the at least one timing arc based upon, at least in part, one or more user-specified boundary conditions.

11. The computer-readable storage medium of claim 8, wherein the characterization information includes one or more of data segment delays, clock segment delays, timing check value, characterization adjustments, and characterization value.

12. The computer-readable storage medium of claim 9, wherein the at least one timing arc type includes one or more of timing check arcs, sequential arcs, and combinational arcs.

13. The computer-readable storage medium of claim 12, wherein the timing check arcs include one or more of setup, hold, recovery, removal, no change, data to data, and clock style checks.

14. The computer-readable storage medium of claim 8, wherein the worst timing path includes a path having a worst negative slack.

15. A computer-implemented method for performing static timing analysis in an electronic design comprising:
   storing one or more extracted timing models ("ETM") at a data storage device;
   receiving, using at least one processor, an electronic design at a debugging platform without performing a model extraction phase;
   mapping the one or more stored extracted timing models ("ETM") to one or more netlist objects associated with the electronic design;
   receiving, at the debugging platform, at least one timing arc specified by a source pin and a sink pin, wherein the at least one timing arc is associated with the electronic design;
   generating a worst timing path based upon, at least in part, the received at least one timing arc, wherein generating a worst timing path includes performing timing reporting for one or more user-specified boundary conditions; and
   generating characterization information for the at least one timing arc based upon, at least in part, one or more user-specified boundary conditions.

16. The computer-implemented method of claim 15, further comprising:
   receiving, at the debugging platform, at least one timing arc type to be reported.

17. The computer-implemented method of claim 15, wherein mapping includes generating a data structure corresponding to the mapping and storing the data structure.

18. The computer-implemented method of claim 15, wherein the characterization information includes one or more of data segment delays, clock segment delays, timing check value, characterization adjustments, and characterization value.

19. The computer-implemented method of claim 16, wherein the at least one timing arc type includes one or more of timing check arcs, sequential arcs, and combinational arcs.

20. The computer-implemented method of claim 19, wherein the timing check arcs include one or more of setup, hold, recovery, removal, no change, data to data, and clock style checks.

\* \* \* \* \*